(No Model.)

H. A. CLARK.
CUFF FASTENER.

No. 373,272.   Patented Nov. 15, 1887.

WITNESSES:
Henry J. Stapelton.
Geo. W. Carey

INVENTOR:
Herbert A. Clark
by Edson Salisbury Jones
Attorney

UNITED STATES PATENT OFFICE.

HERBERT A. CLARK, OF ATTLEBOROUGH, MASSACHUSETTS.

CUFF-FASTENER.

SPECIFICATION forming part of Letters Patent No. 373,272, dated November 15, 1887.

Application filed December 10, 1886. Serial No. 221,186. (No model.)

*To all whom it may concern:*

Be it known that I, HERBERT A. CLARK, of Attleborough, in the county of Bristol and State of Massachusetts, have invented a new and useful Improvement in Fasteners for Cuffs, &c.; and I do hereby declare the following specification, taken in connection with the accompanying drawings, forming a part of the same, to be a description thereof.

This invention relates to a fastening device, which is particularly adapted to secure cuffs to the sleeves of ladies' dresses, and may also be used for other purposes as well.

It consists in certain features of construction and arrangement, hereinafter described and claimed.

Figure 1:
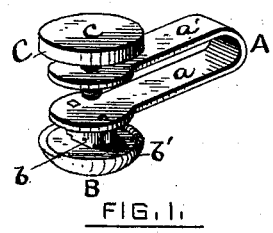
Figure 2:
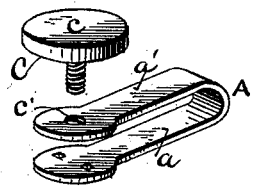
Figure 3:
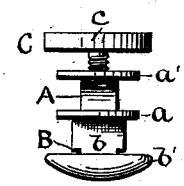
Figure 4:
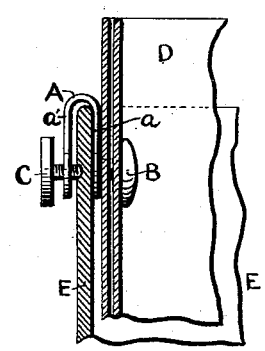

In the accompanying drawings, Figure 1 represents in perspective the device on an enlarged scale. Fig. 2 shows the clamp-screw and the body member detached and in perspective. Fig. 3 represents an end view of the device. Fig. 4 shows in section a portion of a cuff and a dress-sleeve, the former being attached to the latter by the fastening device, which is shown in side view.

The device consists of a body portion, A, composed of two arms, $a$ $a'$, of any desired length, joined to each other, so as to make the body substantially U shape. Preferably the body member is made from a strip of metal bent centrally upon itself to form the arms $a$ $a'$. To the arm $a$ is secured a member, B, for attaching the body to a cuff or other article, the said member, as shown in Figs. 1 to 4, inclusive, being of a T shape and composed of a post or shank, $b$, riveted, soldered, or otherwise secured to the arm $a$, and a sleeve portion, $b'$, rigidly secured to the post $b$, or hinged to turn thereon, as in well-known hinged shoe, sleeve, and collar buttons. The arm $a'$ is provided with a clamping device, C, which, as shown in the drawings, is in the form of a screw passing through a threaded hole, $c'$, in the arm $a'$, so as to clamp between the screw end and the arm $a$ the dress-sleeve or other article inserted between the arms of the body A.

If it be desired to secure a lady's cuff to her dress-sleeve, the shoe portion $b'$ of the member B is passed through the button-holes in the cuff D, Fig. 4. The cuff is then inserted into the sleeve E, which is passed between the arms $a$ $a'$ of the body, and the screw C is turned to securely attach the sleeve to the body A, thereby securing the cuff to the dress-sleeve, within which the cuff will be held in the desired place.

The head $c$ of the screw C may be plain or ornamental and of any preferred form or style, and either or both of the arms $a$ $a'$ may be plain or ornamented and have any desired edge contour.

What I claim, and desire to secure by Letters Patent, is—

A fastening device for cuffs, &c., having a U-shaped body portion, one of the arms of which is provided with a fastening member, B, for securing the body to a cuff, and the other arm of which is furnished with a screw-clamp member for attaching the article to the garment, substantially as set forth.

HERBERT A. CLARK.

Witnesses:
EDSON SALISBURY JONES,
HENRY J. STAPELTON.